(12) United States Patent
Derrien et al.

(10) Patent No.: US 9,969,118 B2
(45) Date of Patent: May 15, 2018

(54) METHOD FOR PRODUCING CONTAINERS, COMPRISING A DELAYED BOXING OPERATION

(71) Applicant: SIDEL PARTICIPATIONS, Octeville sur Mer (FR)

(72) Inventors: Mikael Derrien, Octeville sur Mer (FR); Pierrick Protais, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 261 days.

(21) Appl. No.: 14/443,796

(22) PCT Filed: Nov. 13, 2013

(86) PCT No.: PCT/FR2013/052731
§ 371 (c)(1),
(2) Date: May 19, 2015

(87) PCT Pub. No.: WO2014/076421
PCT Pub. Date: May 22, 2014

(65) Prior Publication Data
US 2015/0290867 A1 Oct. 15, 2015

(30) Foreign Application Priority Data

Nov. 19, 2012 (FR) ..................... 12 60993

(51) Int. Cl.
*B29C 49/18* (2006.01)
*B29C 49/78* (2006.01)
(Continued)

(52) U.S. Cl.
CPC ............. *B29C 49/78* (2013.01); *B29C 49/12* (2013.01); *B29C 49/18* (2013.01); *B29C 49/541* (2013.01);
(Continued)

(58) Field of Classification Search
None
See application file for complete search history.

(56) References Cited

U.S. PATENT DOCUMENTS 4,035,455 A * 7/1977 Rosenkranz ............ B29C 33/10
264/296
4,177,239 A * 12/1979 Gittner .................... B29C 49/08
264/529
(Continued)

FOREIGN PATENT DOCUMENTS

DE 20 2011 109976 U1 9/2012
GB 2 141 662 A 1/1985
(Continued)

OTHER PUBLICATIONS

International Search Report, dated Jan. 21, 2014, from corresponding PCT application.

*Primary Examiner* — Edmund Lee
(74) *Attorney, Agent, or Firm* — Young & Thompson

(57) ABSTRACT

A method for producing a container (2) from a blank (3) in a mold (1) provided with a wall (4) and a mold bottom (8) that is movable relative to the wall (4) between a retracted position and a deployed position, the method including: a phase of introducing the blank (3) into the mold; a preblowing phase including the injection, into the blank (3), of a fluid pressurized to a so-called preblowing pressure, a blowing phase following the preblowing phase and including the injection, into the blank (3), of a fluid pressurized to a so-called blowing pressure greater than the preblowing pressure; a boxing phase including the displacement of the mold bottom (8) from the retracted position thereof to the deployed position thereof, initiated after the pressure in the blank (3) has reached the blowing pressure.

12 Claims, 4 Drawing Sheets

(51) Int. Cl.
  *B29C 49/12*    (2006.01)
  *B29C 49/54*    (2006.01)
  *B29C 49/62*    (2006.01)
  *B29C 49/70*    (2006.01)
  *B29C 49/06*    (2006.01)
  *B29C 49/48*    (2006.01)
  *B29K 67/00*    (2006.01)
  *B29L 31/00*    (2006.01)

(52) U.S. Cl.
  CPC .............. *B29C 49/62* (2013.01); *B29C 49/70* (2013.01); *B29C 49/06* (2013.01); *B29C 49/48* (2013.01); *B29C 2049/4892* (2013.01); *B29K 2067/003* (2013.01); *B29L 2031/7158* (2013.01)

(56) References Cited

U.S. PATENT DOCUMENTS

| | | | | |
|---|---|---|---|---|
| 4,465,199 A * | 8/1984 | Aoki | ........................ | B29C 49/12 215/373 |
| 4,584,158 A * | 4/1986 | Nilsson | ................... | B29C 49/12 264/529 |
| 5,785,921 A * | 7/1998 | Outreman | ................ | B29C 49/48 264/529 |
| 6,277,321 B1 * | 8/2001 | Vailliencourt | .......... | B29C 49/18 264/529 |
| 7,338,272 B2 * | 3/2008 | Miller | ..................... | B29C 49/48 425/182 |
| 9,636,878 B2 * | 5/2017 | Mast | ....................... | B29C 49/00 |
| 9,676,140 B2 * | 6/2017 | Deau | .................... | B29C 49/4242 |
| 2002/0027308 A1 * | 3/2002 | Koppenhofer | ........ | B29C 51/343 264/163 |
| 2005/0058741 A1 * | 3/2005 | Fujii | ....................... | B29C 49/18 425/529 |
| 2010/0203187 A1 * | 8/2010 | Schmid | ................... | B29C 49/56 425/541 |
| 2011/0135778 A1 * | 6/2011 | Andison | ................. | B29C 49/46 425/524 |
| 2012/0031916 A1 * | 2/2012 | Derrien | ................ | B65D 1/0261 220/675 |

FOREIGN PATENT DOCUMENTS

JP    2008 254244 A    10/2008
WO    WO2010/058098    *    5/2010

* cited by examiner

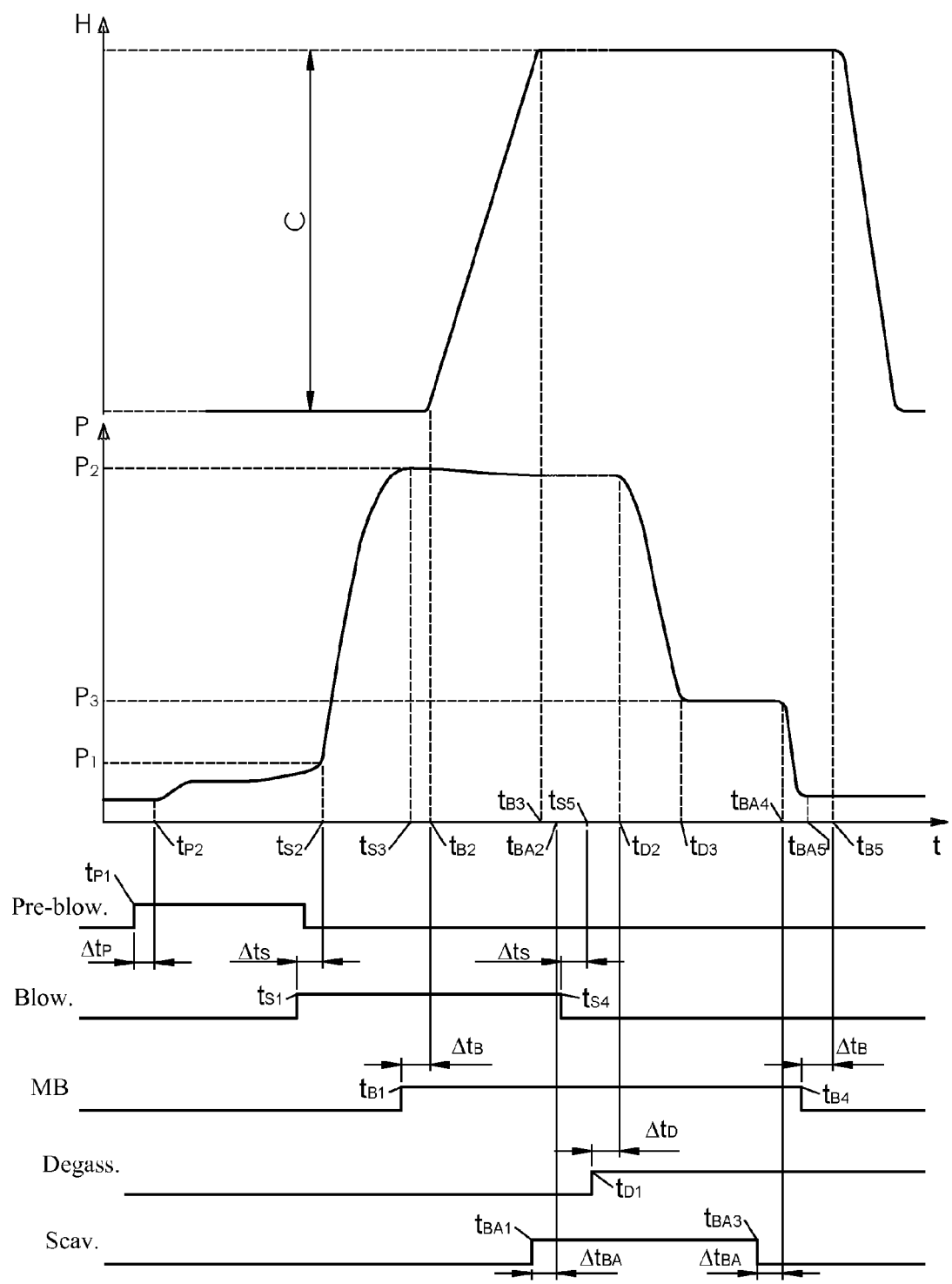

METHOD FOR PRODUCING CONTAINERS, COMPRISING A DELAYED BOXING OPERATION

The invention relates to producing containers by blow-molding blanks of plastic material such as polyethylene terephthalate (PET).

BACKGROUND OF THE INVENTION

A standard technique for producing containers is blow molding (optionally combined with a stretching). This technique consists in introducing the blank (i.e., a preform or an intermediate container that has undergone a preforming operation), previously heated to a temperature that is higher than the glass transition temperature of the material (about 80° in the case of PET), in a mold provided with a wall that defines a cavity having the shape of the container, and in injecting into the blank, through the neck, a fluid, such as a gas (generally air), under pressure to press the material against the wall of the mold.

Ordinarily, this injection of fluid is performed in two steps, namely a first step (known as pre-blow molding) at low pressure (generally from about 5 to 7 bar), followed by a second step (known as blow molding) at high pressure (generally from about 20 to 30 bar).

For hot fill applications, requiring that the container bear greater thermal stresses, it is known to make an overstretched base, intended either to absorb the deformation of the container during a hot fill, or to better withstand the thermal stresses.

To obtain such an overstretched base, normally a molding unit is used that is equipped with a mobile mold base that is initially retracted and that is deployed during forming to push back the material in the area of the base, as is illustrated in the U.S. Pat. No. 6,277,321 (SCHMALBACH-LUBECA).

This technique, currently known as "boxing," is rather difficult to use. Actually, a compromise must be found between the desire to stretch the material beyond its final form so as to increase the taking of the shape of the base and the necessity of preventing the material from setting before having acquired its final form. Although this concern is explicitly mentioned in the above-mentioned document, it, however, remains vague as to solutions that make it possible to remedy it, merely suggesting that it is preferable to limit the delay between the pre-blow-molding phase and the raising of the mold base.

In practice, the manner in which the boxing is conducted has direct consequences on the quality and the performances of the base of the container.

The theoretical modeling of the taking of shape of the base, useful for configuring the machine that is expected to make it possible to obtain containers that conform to specifications, is generally based on the hypothesis of a raising of the mold base at a constant speed (linear model).

The linear model does not, however, take reality correctly into account. Actually, in view of the pressure variations within the container, the resistance exhibited by it to the raising of the mold base during boxing is also variable, which causes a variation of the speed of movement of the mold base.

Under these conditions, it is found that not only does the mold base not achieve its travel at the time anticipated by the theoretical model but also that differences from one mold to the next (and therefore from one container to the next) appear, making it difficult to obtain identical containers that conform to the same specifications.

Furthermore, it will be noted that, given the initial lowered position of the mold base, there is a risk that the material that is overstretched radially beyond the limits of the base of the final container will be pinched (and as the case may be, perforated) during the raising of the mold base.

The reasons that have just been mentioned provide an incentive, with good reason, to anticipate the boxing relative to the blow molding, i.e., to perform the raising of the mold base before injecting the fluid into the blank at high pressure. Moreover, this is what the document U.S. Pat. No. 6,277,321 cited above recommends—without, however, completely justifying it.

To date, due to a lack of direct observation means of the blank during forming, the checking of the quality of the container obtained, and the validation (or the modification) of the parameters programmed into the machine (particularly pressure and blow-molding flow rate, time of ordering movement of the mold base), are performed by operators who are sufficiently qualified and experienced to visually and manually evaluate the quality of the containers.

However, the human checking, although necessary, is nevertheless too long and subjective to make possible a programming that is reliable, rapid and especially that can be extended to the entire set of machines. Since to date the settings are made by guesswork, it is still often necessary, in order to prevent an accumulation of non-conforming containers, to halt the production line.

SUMMARY OF THE INVENTION

The invention aims to enhance the production techniques of containers with boxing, particularly to facilitate the automation of it and to improve the quality and consistency of the containers.

For this purpose, the invention proposes a method for producing a container from a blank of plastic material, within a mold provided with a wall that defines a cavity having the shape of the container, and with a mold base that is mobile relative to the wall between a retracted position in which it extends retracted relative to the cavity, and a deployed position in which it closes the cavity, this method comprising:
  a phase for introduction of the blank into the mold;
  a pre-blow-molding phase comprising the injection into the blank of a fluid under pressure at a so-called pre-blow-molding pressure;
  a blow-molding phase that is after the pre-blow-molding phase and that comprises the injection into the blank of a fluid under pressure at a so-called blow-molding pressure that is greater than the pre-blow-molding pressure;
  a boxing phase comprising the movement of the mold base from its retracted position to its deployed position, this boxing phase being initiated during the blow-molding phase after the pressure in the blank has reached the blow-molding pressure.

In this way, the movement of the mold base becomes independent of the pressure in the container, since it is approximately constant. With a constant movement instruction, the speed of movement of the mold base is consequently constant, just like the time at which the mold base reaches its end of travel. The automation of the method is thus facilitated without it being necessary to review the modeling of the boxing using nonlinear models that are, by nature, complex.

Various additional characteristics can be foreseen, alone or in combination:
an operation for ordering the opening of a boxing solenoid valve at a time $t_{B1}$ is foreseen such that:

$$t_{B1}+\Delta t_B \geq t_{S3}$$

where:
$\Delta t_B$ is the response time of the boxing solenoid valve,
$t_{S3}$ is the time from which the pressure in the blank has reached the blow-molding pressure;
the mold base reaches its deployed position at a time $t_{B3}$ such that:

$$t_{B3} \leq t_{D2}$$

where $t_{D2}$ is a time from which an at least partial depressurization of the blank begins after it is placed in communication with the atmosphere;
the depressurization phase comprises a scavenging step during which are opened simultaneously the degassing solenoid valve and a scavenging solenoid valve for the injection into the container, by a stretching rod pierced with openings, of fluid at the blow-molding pressure
the depressurization phase comprises an operation for ordering the opening of a degassing solenoid valve for putting the blank in communication with the atmosphere, at a time $t_{D1}$ such that:

$$t_{D1}+\Delta t_D \geq t_{B3}$$

where $\Delta t_D$ is the response time of the degassing solenoid valve.
the depressurization phase is preceded by a closing operation of a blow-molding solenoid valve, at a time $t_{S4}$, and an opening operation of a scavenging solenoid valve, at a time $t_{BA1}$, such that:

$$t_{S3}<t_{BA2}<t_{S5}<t_{D2}$$

where:
$t_{BA2}=t_{BA1}+\Delta t_{BA}$
$t_{S5}=t_{S4}+\Delta t_S$
$t_{D2}=t_{D1}+\Delta t_D$
$\Delta t_{BA}$ is the response time of the scavenging solenoid valve,
$\Delta t_S$ is the response time of the blow-molding solenoid valve.
the degassing phase comprises a scavenging step during which the degassing solenoid valve and a scavenging solenoid valve are simultaneously opened;
the depressurization phase comprises a degassing step during which the degassing solenoid valve remains open while the scavenging solenoid valve is closed;
the boxing phase ends with the retraction of the mold base from its high position to its low position, initiated at the end of the degassing step;
the retraction of the mold base is initiated at the same time or after the degassing step is initiated.

BRIEF DESCRIPTION OF THE DRAWINGS

Other objects and advantages of the invention will emerge in light of the description given hereafter with reference to the accompanying drawings in which:
FIG. 4 is a diagram on which are drawn in parallel the position of the mold base, the curve of the variations of the pressure prevailing in the blank, then the container formed from it, and the timing diagrams for ordering pre-blow-molding, blow-molding, boxing, scavenging, degassing operations.

DETAILED DESCRIPTION OF THE PREFERRED EMBODIMENTS

Figure 1:
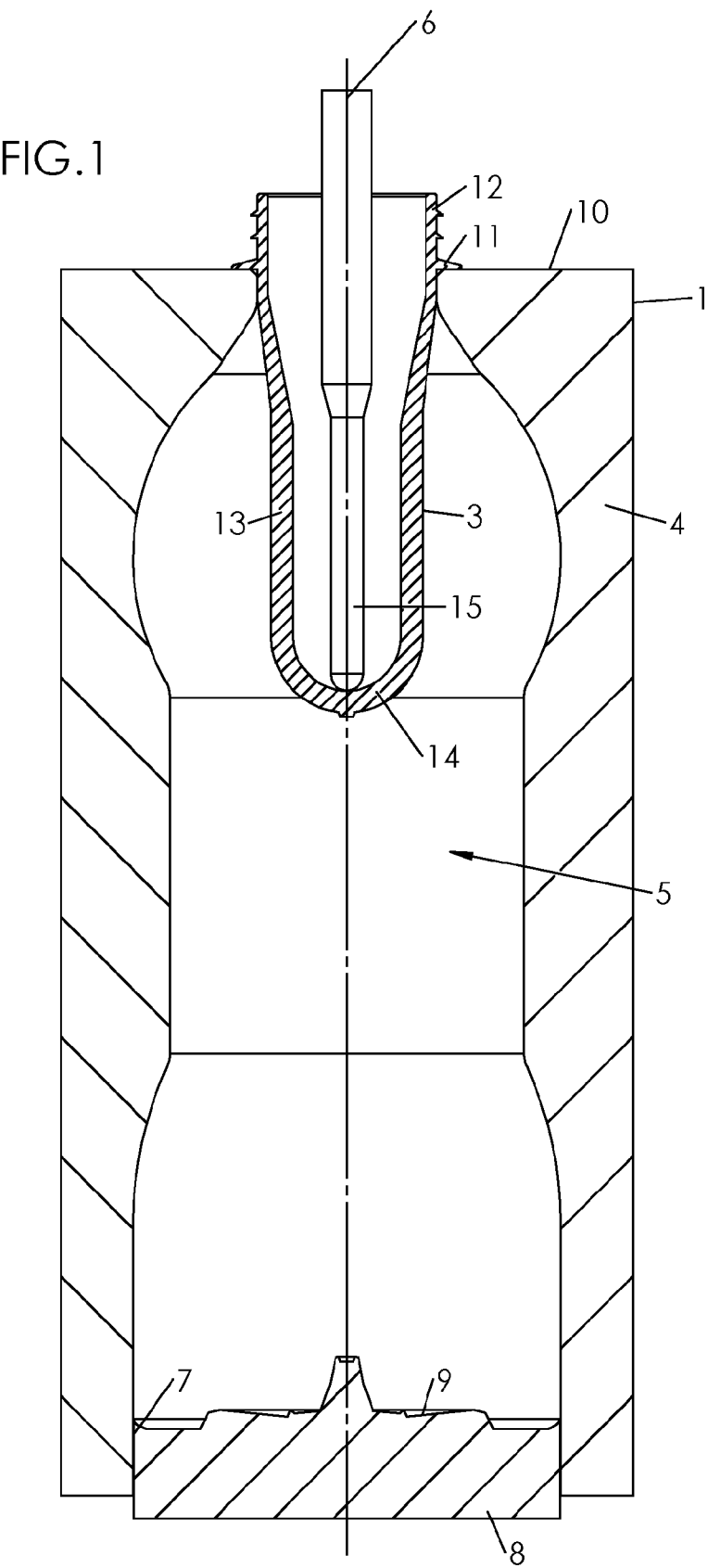
FIG. 1 is a cutaway view showing a mold in which the forming of a container is taking place, shown at the time of the start of a pre-blow-molding operation.
Figure 2:
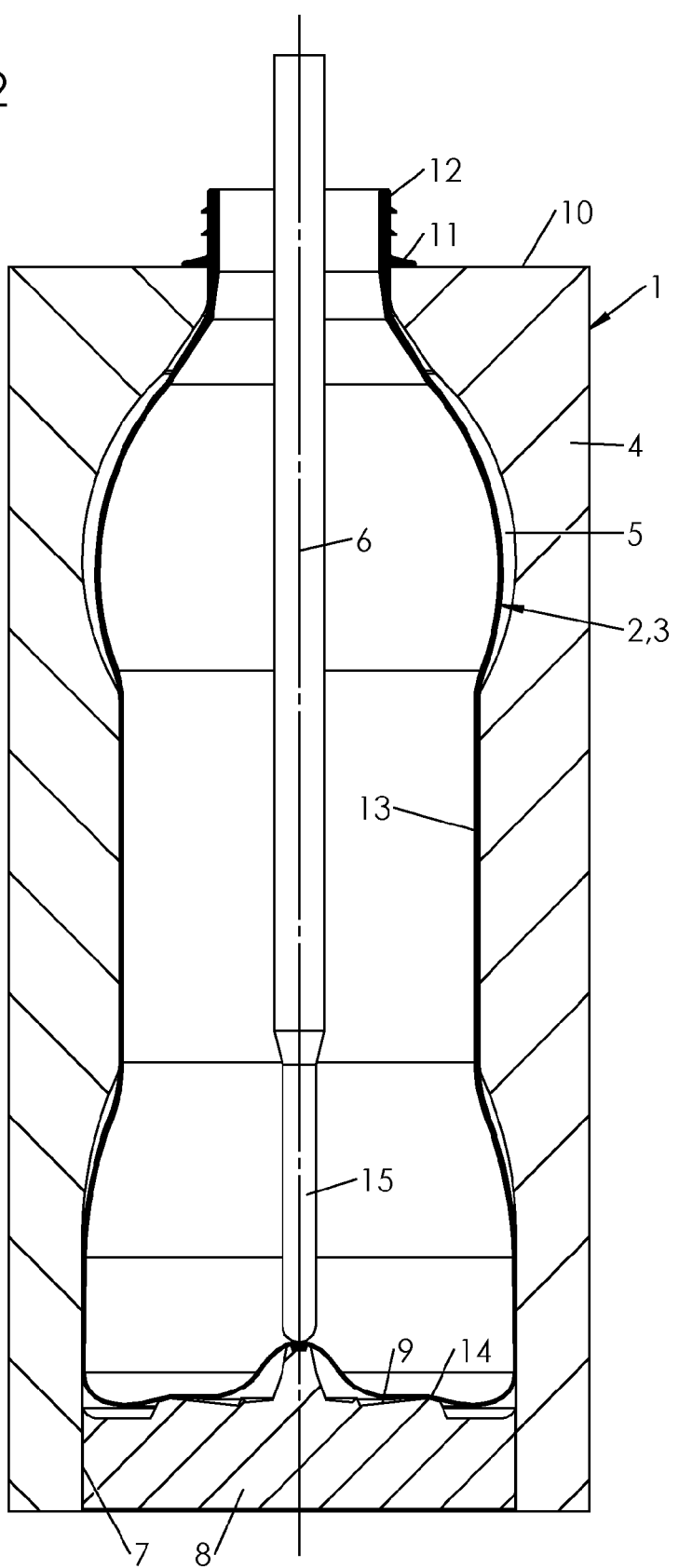
FIG. 2 is a view similar to FIG. 1, at the end of the pre-blow-molding operation.
Figure 3:
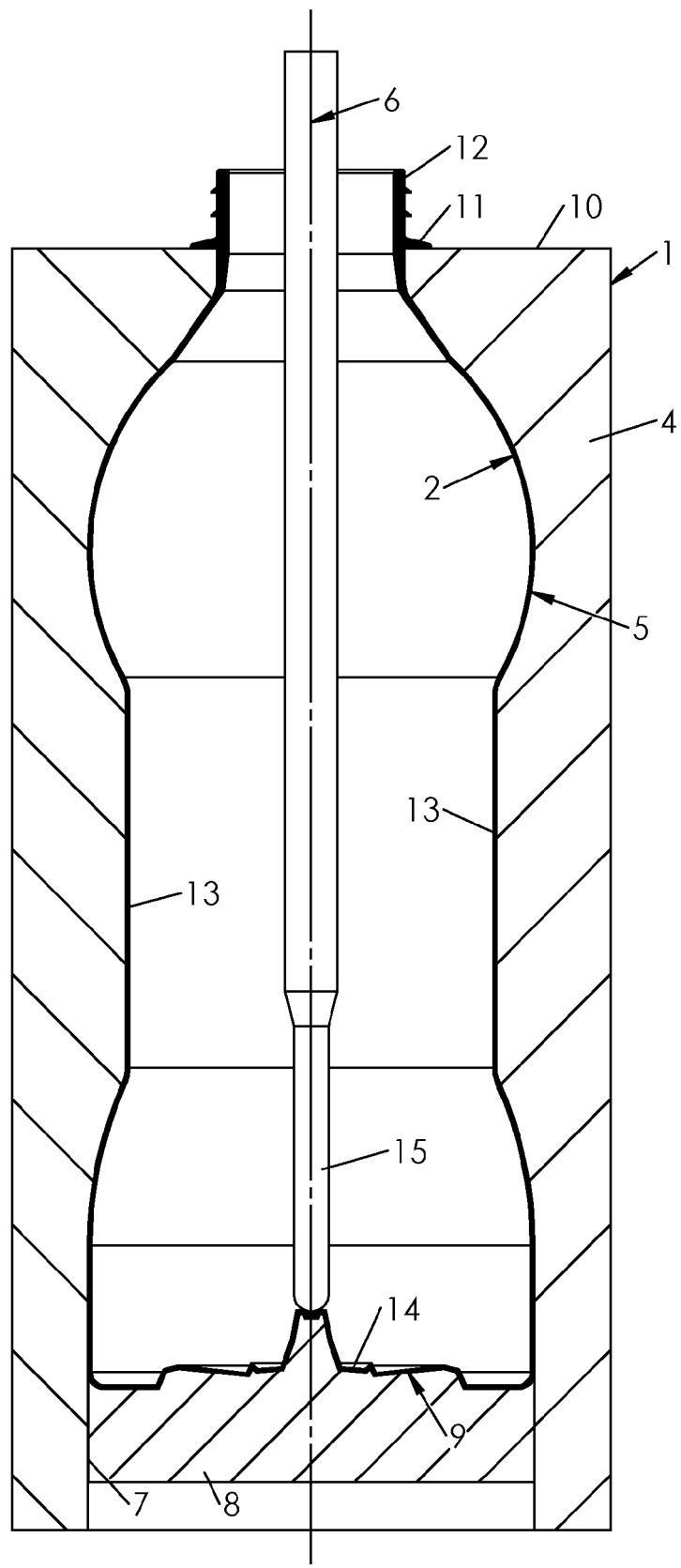
FIG. 3 is a view similar to FIG. 1, at the end of the boxing operation.

Depicted in FIGS. 1 to 3 is a mold 1 for producing a container 2 by stretch blow molding from a blank 3 (in practice, it generally involves a preform, obtained by injection) of plastic material.
This mold 1 comprises a wall 4 that defines an inner cavity 5 distributed around a main axis 6 of the mold that, when the containers to be formed are rotationally symmetric, forms an axis of symmetry of the mold 1.
The cavity 5 partially defines a shape for a lateral wall or body of the container 2. The wall 4 exhibits, in a lower part, an opening 7 that defines a passage for a mold base 8 that is mounted mobile relative to the wall 4 between a low position, shown in FIGS. 1 and 2, in which the mold base 8 is separated from the opening 7 toward the base, and a high position, shown in FIG. 3, in which the mold base 8 blocks the opening 7. The mold base 8 has an upper surface 9 that defines a shape for a base of the container 2. In high position, the mold base 8 closes the cavity 5, thus completing the shape of the container 2, against which the material is applied during the blow molding. By "travel" of the mold base, denoted C in FIG. 4, the distance separating its low position from its high position is meant.
The blank 3, and then the container 2 formed from it, rest on an upper face 10 of the mold 1 by means of a collar 11 of the blank 3 (or of the container 2), which delimits a neck 12 of the blank 3 (or of the container 2), held outside of the mold 1.
Under the collar 11, the blank 3 (then the container 2) has a body 13, which extends overall in the axial direction, and a base 14, which is first of all semi-spherical (FIG. 1), then, once formed against the mold base 8 (FIG. 3), extends overall in the radial direction from a lower end of the body 13.
To produce the container 2 from a blank 3, the procedure is as follows.
The mold 1 being in its configuration shown in FIG. 1, with the base 8 in its low position, the blank 3 previously heated to a temperature greater than the glass transition temperature of the material (about 80° C. in the case of PET) is introduced there.
There is then introduced into the blank 3, through the neck 12, a stretching rod 15 that is mobile in the axial direction; as soon as the rod 15 reaches the base 14 of the blank 3, the pre-blow molding is initiated by injecting into the blank 3 a fluid (particularly air) at a pressure P1 for pre-blow molding (less than 15 bar, and, for example, on the order of 5 to 7 bar). According to a preferred embodiment, the rod 15 is hollow and pierced with holes that open into the cavity 5.
The stretching speed and air flow are such that the rod 15 remains in contact with the base 14 of the blank 3 throughout the pre-blow molding.
When the rod 15 reaches the mold base 8 by pressing the base 14 of the container there that is being formed (FIG. 2), the mold base 8 is still in its low position.
The pre-blow-molding pressure P1 is not sufficient to press the material thoroughly against the wall 4 of the mold 1, and it is necessary to inject into the container 2 being formed a blow-molding pressure P2 that is greater than the pre-blow-molding pressure P1 (in practice, the blow-molding pressure P2 is equal to or greater than 15 bar, and, for example, on the order of 20 to 30 bar).

Then, a sudden rise of pressure is produced in the blank 3, until this pressure is equal to the blow-molding pressure P2. After a predetermined period of maintaining the blow-molding pressure P2 in the container 2 thus formed, it is depressurized in two steps.

A first step consists in maintaining the injection into the container 2 of fluid at the blow-molding pressure P2 by means of the scavenging solenoid valve (the blow-molding solenoid valve being closed), while the container is put in communication with the atmosphere (i.e., open air).

This step, known as scavenging, makes it possible to have the fluid circulate in the container 2 to set the material with it, while keeping it in contact with the wall 4 so as to heat-set it. The pressure in the container 2 undergoes a first rapid drop until stabilizing at an intermediate value P3 between the pre-blow-molding pressure P1 and the blow-molding pressure P2.

A second step, known as degassing, consists in stopping the injection by the scavenging solenoid valve, while maintaining the communication of the container 2 with the atmosphere. The pressure in the container 2 then undergoes a second rapid drop until reaching atmospheric pressure.

An operation of raising the mold base 8, known as boxing, is initiated during the blow-molding operation, so as to impart to the material of the base 14 a slight over-stretching that is conducive to the orientation of the molecules (and therefore to the rigidity) and to the taking of shape on the upper surface 9 of the mold base 8.

FIG. 4 depicts the curves representing, as a function of time, denoted t:
- at the top, the axial position (or height, denoted H) of the mold base 8,
- in the middle, the pressure, denoted P, prevailing in the blank 3 (or the container 2) during forming;
- at the bottom, the solenoid valve timing diagrams for ordering the phases of pre-blow molding (Pre-blow.), of blow molding (Blow.), of scavenging (Scav.), of boxing—i.e., of movement of the mold base (MB) 8—of degassing (Degass.).

The curves are synchronized on the time axis that is common to them, the vertical dotted lines making it possible to make a matching of the curves at certain selected times.

The opening command of the pre-blow-molding solenoid valve is given at a time $t_{P1}$ known as "pre-blow-molding peak start." Since the pre-blow-molding solenoid valve is assigned a response time $\Delta t_P$, the pressure P prevailing in the container 2 undergoes a rise from a time $t_{P2}$ known as "pre-blow-molding real start" such that:

$$t_{P2}=t_{P1}+\Delta t_P.$$

Likewise, the opening command of the blow-molding solenoid valve is given at a time $t_{S1}$ known as "blow-molding peak start." Since the blow-molding solenoid valve is assigned a response time $\Delta t_S$, the pressure P prevailing in the container 2 undergoes an inflection (abrupt rise) at a time $t_{S2}$ known as "blow-molding real start" such that:

$$t_{S2}=t_{S1}+\Delta t_S.$$

The pressure P in the blank rises rapidly, from the time $t_{S2}$ (where the pressure P is about equal to the value of the pre-blow-molding pressure P1), until reaching the value of the blow-molding pressure P2, which corresponds to the maximum value of the pressure prevailing in the container during the entire period of the forming. The time where the pressure P reaches the value of the blow-molding pressure P2, i.e., the time from which the value of the pressure P stops rising, is denoted $t_{S3}$.

The opening command of the boxing solenoid valve ordering the movement of the mold base 8 is given at a time $t_{B1}$ known as "boxing peak start." Since the boxing solenoid valve is assigned a response time $\Delta t_B$, the movement of the mold base 8 from its low position starts at a time $t_{B2}$ known as "boxing real start" such that:

$$t_{B2}=t_{B1}+\Delta t_B.$$

As we have already indicated, and as can be seen in FIG. 4, the boxing is initiated during the blow molding, after the pressure P in the blank 3 has reached its maximum, i.e., the blow-molding pressure P2. In other words, it is intended that the boxing real start $t_{B2}$ is later than the time $t_{S3}$ where the pressure P in the blank 3 has reached its maximum, or:

$$t_{B2} \geq t_{S3}.$$

Although it is conceivable, it is not necessarily satisfactory to order the boxing peak start $t_{B2}$ after the time $t_{S3}$ where the pressure P in the blank 3 reaches its maximum.

It is actually preferable, in order to make a fine adjustment, to take into account the response time $\Delta t_B$ of the boxing solenoid valve, which is a fact that cannot be adjusted but is known and fixed (apart from the derivative of this response time $\Delta t_B$, which can be compensated for).

Thus, taking into account what precedes, in order to initiate the boxing after the time $t_{S3}$, it is enough to adjust the boxing peak start $t_{B1}$ so that:

$$t_{B1}+\Delta t_B \geq t_{S3}.$$

The beginning time of the depressurization phase of the blank 3, during which it is put in communication with the atmosphere, is denoted $t_{D2}$. This time $t_{D2}$ launches a scavenging step, during which the placing in open air and the injection of blow-molding fluid under pressure via the scavenging solenoid valve ensures circulation of fluid in the container 2, conducive to its cooling and to its taking of shape both on its body 13 and on its base 14. Earlier, as shown in FIG. 4, the blow molding has been stopped by closing the blow-molding solenoid valve at the time $t_{S4}$.

The time at which the closing of the blow-molding solenoid valve is ordered is denoted $t_{S4}$, and the time at which the blow-molding solenoid valve is actually closed after its closing order is denoted $t_{S5}$:

$$t_{S5}=t_{S4}+\Delta t_S.$$

Moreover, the time at which the opening of the degassing solenoid valve is ordered for the placing in communication of the container with the atmosphere is denoted $t_{D1}$. Since the degassing solenoid valve is assigned a response time $\Delta t_D$, the degassing solenoid valve is ordered so that the time, denoted $t_{D2}$, at which the depressurization in the container begins, is later than the time $t_{S5}$:

$$t_{D2}>t_{S5}.$$

When the scavenging is implemented, the scavenging solenoid valve order (assigned with a response time $\Delta t_{BA}$) is implemented at a time $t_{BA1}$ such that the opening of the scavenging solenoid valve is effective at a time $t_{BA2}$ (where $t_{BA2}=t_{BA1}+\Delta t_{BA}$) that is definitely later than the time $t_{S3}$, but earlier than the time $t_{S5}$, so as to maintain the pressure in the container before the depressurization is initiated:

$$t_{S3}<t_{BA2}$$

$t_{BA2} < t_{S5}$

So that:

$t_{S3} < t_{BA2} < t_{S5} < t_{D2}$

Once the depressurization has begun, the pressure in the container 2 drops rapidly until stabilizing at the intermediate value P3. The time from which the pressure P in the container 2 reaches the intermediate pressure P3 (known as scavenging pressure and depending on the value of the blow-molding pressure P2 and on the flow rates of the blow-molding and degassing solenoid valves) is denoted $t_{D3}$.

The closing of the scavenging solenoid valve is ordered at a time denoted $t_{BA3}$. Taking into account the response time $\Delta t_{BA}$ of the scavenging solenoid valve, the fluid at the blow-molding pressure P2 ceases to be injected into the container 2 at a time denoted $t_{BA4}$ such that:

$t_{BA3} + \Delta t_{BA} = t_{BA4}$

From this time $t_{BA4}$, the degassing step starts during which the pressure P in the container 2 undergoes a new drop, reaching the atmospheric pressure and becoming stable at it.

Moreover, the time where the mold base reaches its deployed position (i.e., its end of travel) is denoted $t_{B3}$. According to a preferred embodiment, shown in FIG. 4, this time $t_{B3}$ is less than the beginning time $t_{D2}$ of the degassing phase:

$t_{B3} \leq t_{D2}$

In other words, the boxing phase is completed at the latest at the end of the blow-molding phase (i.e., before the beginning of the degassing step at the time $t_{D2}$). Taking into account the response time $\Delta t_D$ of the degassing solenoid valve, the time $t_{D1}$ at which the opening of the degassing solenoid valve is ordered is selected such that:

$t_{D2} = t_{D1} + \Delta t_D \geq t_{B3}$.

The boxing phase ends by the retraction of the mold base 8 from its high position to its low position. This retraction is ordered at a time denoted $t_{B4}$ and initiated effectively from a time denoted $t_{B5}$ such that:

$t_{B4} + \Delta t_B = t_{B5}$

This retraction is preferably initiated at the earliest at the end of the scavenging step, and optionally during the degassing. In other words, if the time from which the pressure in the container is equal to the atmospheric pressure is denoted $t_{BA5}$:

$t_{B5} \geq t_{BA5}$

The pressure P in the container 2 having reached it maximum value (i.e., the blow-molding pressure P2) before the boxing is initiated, the forces being exerted on the mold base 8 in the container 2 and being opposed to the rise of the base 8 during the boxing do not increase during the boxing. Therefore, it is not necessary to increase the forces being exerted on the mold base 8 to continue its movement.

Furthermore, since the abrupt increase phase of the pressure in the container has already been completed, the material of the blank 2 has essentially reached the mold base 8 (on the upper surface 9 of which it is kept centered by the rod 15), and the uncertainties of form linked to possible shifts of the material during the boxing phase are limited. The effect of this is a greater consistency in the quality of the containers produced.

When the boxing is performed so as to ensure that the mold base 8 reaches its high position before the end of blow molding, the speed of movement of the mold base 8 is approximately constant during the entire boxing. This linearity is rendered by the movement curve of the mold base in FIG. 4 between the times $t_{B2}$ and $t_{B3}$. The effect of this is an improved predictability of the movement of the mold base 8 and therefore of the taking of shape of the base 14 of the container 2.

The method that has just been described is not suited to all molds; it is suited, in particular, to a mold (such as the one shown in the accompanying drawings) in which the problems of the pinching of material between the wall of the mold and the mold base in low position or those problems due to a slight boxing travel relative to the needs that said form necessitates do not occur.

The invention claimed is:

1. A method for producing a container (2) from a blank (3) of plastic material, within a mold (1) provided with a wall (4) that defines a cavity (5) having the shape of the container (2), and with a mold base (8) that is mobile relative to the wall between a retracted position in which the mold base (8) extends retracted relative to the cavity (5), and a deployed position in which the mold base (8) closes the cavity (5), the method comprising:
    a phase for introduction of the blank (3) into the mold;
    a pre-blow-molding phase comprising the injection into the blank (3) of a fluid under pressure at a pre-blow-molding pressure;
    a blow-molding phase that is after the pre-blow-molding phase and that comprises the injection into the blank (3) of a fluid under pressure at a blow-molding pressure that is greater than the pre-blow-molding pressure; and
    a boxing phase comprising the movement of the mold base (8) from the retracted position to the deployed position,
    wherein the boxing phase (3) is initiated during the blow-molding phase after the pressure in the blank (3) has reached the blow-molding pressure.

2. The method according to claim 1, further comprising:
    an operation for ordering the opening of a boxing solenoid valve for the movement of the mold base (8), at a time $t_{B1}$ such that:

$t_{B1} + \Delta t_B \geq t_{S3}$ where:
    $\Delta t_B$ is the response time of the boxing solenoid valve, and
    $t_{S3}$ is the time from which the pressure in the blank (3) has reached the blow-molding pressure.

3. The method according to claim 2, wherein the boxing phase is conducted in such a way that the mold base (8) reaches the deployed position at a time $t_{B3}$ such that:

$t_{B3} \leq t_{D2}$ where $t_{D2}$ is a time from which an at least partial depressurization phase of the blank (3) begins after the blank is placed in communication with the atmosphere.

4. The method according to claim 3, wherein the depressurization phase comprises an operation for ordering the opening of a degassing solenoid valve for putting the blank (3) in communication with the atmosphere, at a time $t_{D1}$ such that:

$t_{D1} + \Delta t_D \geq t_{B3}$ where $\Delta t_D$ is the response time of the degassing solenoid valve.

5. The method according to claim 4, wherein the depressurization phase comprises a scavenging step during which are opened simultaneously the degassing solenoid valve and a scavenging solenoid valve for the injection into the container, by a stretching rod pierced with openings, of fluid at the blow-molding pressure.

6. The method according to claim 4, wherein the depressurization phase is preceded by an operation for closing a blow-molding solenoid valve, at a time $t_{s4}$, and by an operation for opening a scavenging solenoid valve, at a time $t_{BA1}$, such that:

$$t_{S3} < t_{BA2} < t_{S5} < t_{D2}$$

where:

$$t_{BA2} = t_{BA1} + \Delta t_{BA}$$

$$t_{S5} = t_{S4} + \Delta t_S$$

$$t_{B2} = t_{D1} + \Delta t_D$$

$\Delta t_{BA}$ is the response time of the scavenging solenoid valve, and $\Delta t_S$ is the response time of the blow-molding solenoid valve.

7. The method according to claim 5, wherein the depressurization phase further comprises a degassing step during which the degassing solenoid valve remains open while the scavenging solenoid valve is closed.

8. The method according to claim 7, wherein the boxing phase ends with the retraction of the mold base (8) from a high position to a low position, which is initiated at the end of the degassing step.

9. The method according to claim 8, wherein the retraction of the mold base (8) is initiated at either of a same time or after the degassing step is initiated.

10. The method according to claim 6, wherein the depressurization phase further comprises a degassing step during which the degassing solenoid valve remains open while the scavenging solenoid valve is closed.

11. The method according to claim 10, wherein the boxing phase ends with the retraction of the mold base (8) from a high position to a low position, which is initiated at the end of the degassing step.

12. The method according to claim 11, wherein the retraction of the mold base (8) is initiated at either of a same time or after the degassing step is initiated.

* * * * *